United States Patent Office 3,754,041
Patented Aug. 21, 1973

3,754,041
LONG CHAIN UNSATURATED NITRO COMPOUNDS
Tetsuo Mitsuyasu, Fujisawa-shi, and Kiyotaka Ohno and Jiro Tsuji, Kamakura-shi, Japan, assignors to Toyo Rayon Company, Ltd., Tokyo, Japan
No Drawing. Filed Dec. 4, 1969, Ser. No. 882,284
Claims priority, application Japan, Dec. 5, 1968, 43/88,648; Mar. 10, 1969, 44/17,543
Int. Cl. C07c 79/06, 79/10
U.S. Cl. 260—644                 2 Claims

ABSTRACT OF THE DISCLOSURE

Long chain unsaturated nitro and amino compounds are disclosed. The long chain nitro compounds are produced by reacting an organic nitro compound having at least one hydrogen attached to the carbon atom alpha to the nitro group with a conjugated diene preferably in the presence of a palladium or platinum catalyst. The corresponding amino compound is thereafter formed by reducing of the nitro group. The nitro and amino compounds of this invention are valuable intermediates for the manufacture of organic compounds especially surface active materials and polymers.

BACKGROUND OF THE INVENTION

(1) Field of the invention

The present invention relates to a novel process for the preparation of long chain nitro and amino compounds.

(2) Description of the prior art

Some long chain primary amino compounds are known. Such long chain amino compounds are used as starting materials in the manufacture of surface active agents and the like. Almost all of these prior art long chain primary amines are prepared by processes using the corresponding fatty acids as one of the reactants. Since the supply of the fatty acids with the exception of the straight chain higher fatty acids is limited, the type of compounds which can be obtained using the prior art processes is likewise limited.

It is accordingly an object of this invention to provide an improved process for the manufacture of long chain nitro and amino compounds.

It is a more specific object to provide a process for the manufacture of long chain nitro and amino compounds which is not dependent on the supply of fatty acids.

It is a further object to provide novel long chain nitro and amino compounds.

Other objects and advantages of this invention will become further apparent from a further study of the attached specifications and subjoined claims.

SUMMARY OF THE INVENTION

The object of this invention have been achieved by providing a process wherein an organic nitro compound having at least one hydrogen atom on the α carbon atom is reacted with a conjugated diene.

DESCRIPTION OF THE PREFERRED EMBODIMENT

A representative example of the reactions performed according to the process of the present invention is shown below using butadiene as the conjugated diene. The reactions are as follows.

$$\underset{R'}{\overset{R}{\diagdown}}CH-NO_2 + 2CH_2=CH-CH=CH_2 \longrightarrow$$

$$\underset{R'}{\overset{R}{\diagdown}}\underset{CH_2-CH=CHCH_2CH_2CH=CH_2}{\overset{C-NO_2}{\diagup}} +$$
(Compound I)

$$\underset{R'}{\overset{R}{\diagdown}}\underset{CH_2=CH-CH-CH_2CH_2CH_2CH=CH_2}{\overset{C-NO_2}{\diagup}}$$
(Compound II)

wherein R and R' are the same or different and each stands for hydrogen or a hydrocarbon radical.

When the group R stands for hydrogen the further reaction may take place.

Compound I + $2CH_2=CH-CH=CH_2 \longrightarrow$ $$\begin{array}{c} CH_2CH=CHCH_2CH_2CH=CH_2 \\ | \\ R'-C-NO_2 \\ | \\ CH_2CH=CHCH_2CH_2CH=CH_2 \end{array}$$
(Compound III)

When both R and R' are hydrogen the following further reaction may also occur.

Compound III + $2CH_2=CH-CH=CH_2 \longrightarrow$ $$\begin{array}{c} CH_2CH=CHCH_2CH_2CH=CH_2 \\ | \\ O_2N-C-CH_2CH=CHCH_2CH_2CH=CH_2 \\ | \\ CH_2CH=CHCH_2CH_2CH=CH_2 \end{array}$$
(Compound IV)

As can be seen from the above reaction formulae, the process of the present invention provides entirely new reactions for the preparation of unsaturated nitro compounds corresponding to Formulae I–IV (Compound II being produced only in a small amount) by the reaction of the hydrogen atoms, attached to the α-carbon atom of a nitro compound of the formula $$\underset{R'}{\overset{R}{\diagdown}}CH-NO_2$$

wherein R, R' are H or hydrocarbon radicals, with a conjugated diene.

The long chain nitro compounds prepared as noted above can be reduced to the corresponding long chain amine compound. By selecting of the proper reduction method it is also possible to convert the unsaturated nitro compounds in either a saturated or unsaturated long chain amine.

Typical long chain nitro and amino compounds which may be produced by the process of this invention are those represented by the formula

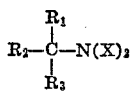

wherein X is oxygen or hydrogen; $R_1$ is an unsaturated radical such as (a)         —CH$_2$CH=CHCH$_2$CH$_2$CH$_2$CH=CH$_2$ or (b) 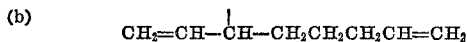

and when X is hydrogen $R_1$ may also stand for a saturated radical such as (c)         —(CH$_2$)$_7$CH$_3$ $R_1$ and $R_2$ stand for hydrogen, alkyl having 1–15 carbon atoms, cycloalkyl having 5–12 carbon atoms or an aryl having 5–12 carbon atoms. Either one or both of $R_1$ and $R_2$ can also be a radical of Formula (a) above and when X is hydrogen $R_1$ and $R_3$ can also be a saturated radical of Formula (c) above.

The nitro compounds which are employed as the starting material in the process of the present invention are represented by the formula

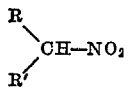

wherein R, R' stand for H or an aliphatic group, especially an alkyl group having 1–15 carbon atoms, an alicyclic group, especially a cycloalkyl group or an aromatic group, especially an aryl group having 5–12 carbon atoms. Hydrocarbon radicals having a number of carbon atoms greater than the preferred ranges noted above may likewise be employed in the process of this invention.

Specific examples, of certain preferred nitro compounds for employment in this invention are nitromethane, nitroethane, nitropropane (primary, secondary), nitrobutane (primary, secondary), nitropentane, 1-nitrodecane, nitrocyclopentane, nitrocyclohexane, nitrocyclooctane, phenyl nitromethane, diphenylnitromethane and phenyl nitroethane. However, it goes without saying that the nitro compounds which may be employed are not limited to those noted above.

As the conjugated diene which is an additional starting material in the process of the present invention any diene having a conjugated double bond, namely, 1,3-butadiene and derivatives thereof may be used.

Derivatives which are obtained by substituting one or more hydrogen atoms of 1,3-butadiene with alkyl groups, halogen, or other groups not adversely affecting the subject reaction may be used. Especially suitable for use in this invention are a conjugated diene whose main chain contains 4 carbon atoms, and most especially alkadienes having a total of 4–8 carbon atoms. As such conjugated diene, there can be mentioned 1,3-butadiene, isoprene, chloroprene, 2-ethyl-1, 3-butadiene and 2,3-dimethyl-1,3-butadiene. The butadiene reactant need not be pure. It can contain other saturated or unsaturated olefins. For example, C$_4$ fractions obtained by cracking can be used which contain butadiene, isobutene, butenes and butane but only the butadiene will take part in addition reaction.

To initiate the process of the present invention palladium and platinum catalysts are most effective. As the palladium catalyst, any catalyst which contains palladium as the main metal is useful with catalysts containing zero-valent or divalent palladium being most effective. Palladium catalyst complexes which are zero-valent or palladium complexes capable of easily becoming zero-valent are preferably employed. Examples of suitable palladium catalysts are (Ph$_3$P)$_4$Pd,

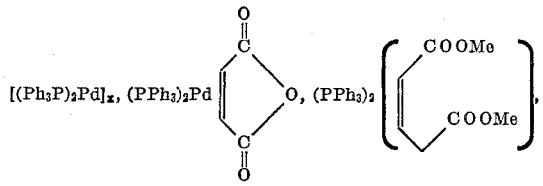

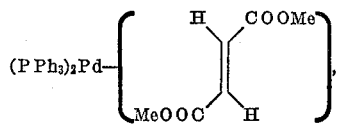

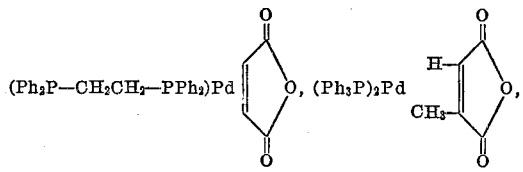

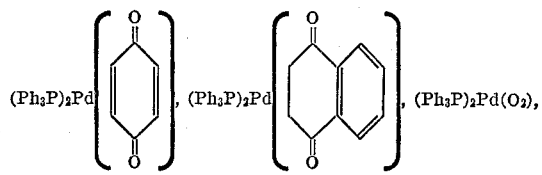

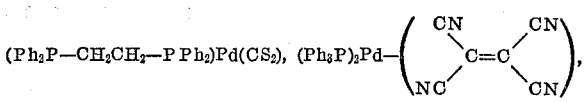

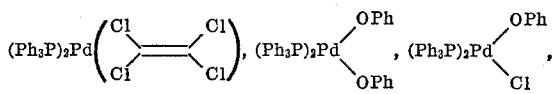

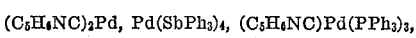

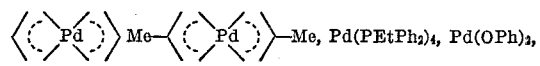

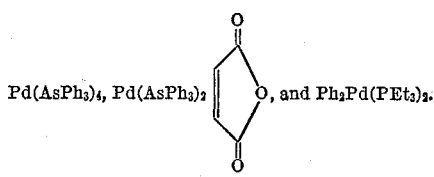

Additional examples of suitable palladium catalysts are

PdCl$_2$, PdBr$_2$, PdI$_2$, Na$_2$PdCl$_4$, Li$_2$PdCl$_4$, K$_2$PdCl$_4$, Pd(CN)$_2$, PdSO$_4$,

Pd(NO$_3$)$_2$, Pd(SCN)$_2$, Pd(OCOCH$_3$)$_2$,

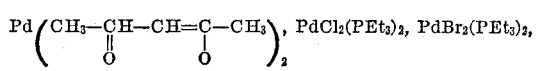

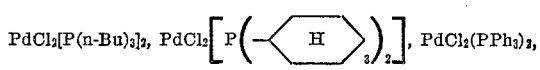

PdBr$_2$(PPh$_3$)$_2$, PdCl$_2$[P(—⟨C$_6$H$_4$⟩—OMe)$_3$]$_2$,

PdCl$_2$[P(—⟨C$_6$H$_4$⟩—Cl)$_3$]$_2$,

PdCl$_2$(P—CH$_2$—CH$_2$—P(Ph)(Ph))(Ph)(Ph), (Pd(Cl)(Ph)(PPh$_3$)), MePd(PEt$_3$)$_2$Br,

CH$_3$COPd(PEt$_3$)$_2$Cl, (Ph—C≡C)$_2$Pd(PEt$_3$)$_2$, (Ph—C≡C)$_2$Pd(PPh$_3$)$_2$,

PdCl$_2$(Ph$_2$P—CH$_2$CH$_2$—S—Ph), PdCl$_2$(AsPh$_3$)$_2$, PdBr$_2$(AsPh$_3$)$_2$, (Pd(Cl)(AsPh$_3$)), PdCl$_2$(SbPh$_3$)$_2$, (PhNC)$_2$PdCl$_2$, [norbornadiene·PdCl$_2$], (cyclooctadiene·PdCl$_2$), ((Pd(Cl))$_2$), (Me(Pd(Cl)))$_2$, ((Pd(Br))$_2$), (Pd(O—C(Me)=CH—C(Me)=O)), trans-Pd(NH$_3$)$_2$(NO$_2$)$_2$, PdCl$_2$(N⟨C$_5$H$_4$N⟩)$_2$, PdCl$_2$(φ—NH$_2$)$_2$, PdCl$_2$[bipyridyl], PdBr$_2$[bipyridyl], PdCl$_2$[H$_2$N—CH$_2$—CH$_2$—NH$_2$]$_2$, [Me-N(Me)-N(Me)-Me]PdCl$_2$, PdCl$_2$(⟨C$_6$H$_4$⟩—C(H)=N—OH)$_2$ and PdCl$_2$(⟨C$_6$H$_4$⟩=N—OH)$_2$ From the above descriptions, it can be seen that the palladium catalysts which are generally employed are palladium salt or complexes. However, the palladium catalysts suitable for employment are not limited to those mentioned above.

The platinum catalysts which are employed in the invention contain platinum as the main metal, preferably zero-valent, divalent or tetra-valent platinum, for example, inorganic salts such as PtI$_2$ and PtCl$_2$, inorganic complex such as H$_2$PtCl$_6$·6H$_2$O, K$_2$PtI$_6$, K$_2$Pt(CN)$_4$·3H$_2$O, K$_2$PtCl$_6$, K$_2$PtCl$_4$ and Na$_2$PtCl$_6$·6H$_2$O, trivalent phosphorus, arsenic and antimony complex compounds such as

[Pt(P(C$_2$H$_5$)$_3$)$_4$][PtCl$_4$],
[Pt(P(OC$_2$H$_5$)$_3$)$_4$]Cl$_2$,
PtCl$_2$[As(C$_4$H$_9$)$_3$]$_2$,
PtCl$_2$[Sb(C$_2$H$_5$)$_3$]$_2$,
Pt[P(C$_6$H$_5$)$_3$]$_4$,
Pt[P(C$_6$H$_5$)$_3$]$_3$,

Pt[P(C$_6$H$_5$)$_3$]$_2$[benzoquinone], Pt[P(C$_6$H$_5$)$_3$]$_2$(HCCOOCH$_3$)(HCCOOCH$_3$), PtCl$_2$[P(C$_6$H$_5$)$_3$]$_2$, PtCl$_2$[As(C$_6$H$_5$)$_3$]$_2$, HPtCl[P(C$_6$H$_5$)$_3$]$_3$, Pt[P(OC$_6$H$_5$)$_3$]$_4$, PtCl(π-C$_3$H$_5$)P(C$_6$H$_5$)$_3$ and C$_2$H$_5$PtCl[P(C$_6$H$_5$)$_3$]$_2$ and an organic ligand complex such as Pt(π-C$_3$H$_5$)$_2$, KPtCl$_3$(CH$_2$=CH$_2$) and K$_2$PtCl$_3$(CH$_3$—CH=CH$_2$).

The palladium or platinum catalyst of the type described above have a sufficient catalytic activity. However, by making a cocatalyst containing an excess amount of a trivalent phosphorus, arsenic or antimony compound based on palladium or platinum, the catalytic activity of palladium or platinum is increased and further the life of the catalyst is substantially prolonged.

As such trivalent phosphorus, arsenic or antimony compounds, there are the phosphine, arsine and stibines with the tertiary phosphines being preferred. As substituents bonded to the phosphorus, arsenic or antimony in the catalyst, alkyl group (preferably C$_{1-15}$), aryl group (preferably C$_{6-15}$) and cycloalkyl group (preferably C$_{6-15}$), are preferred. Specific examples of these catalysts are triethylphosphine, trimethylphosphine, tributylphosphine, tricyclohexylphosphine, triphenylphosphine, tritolylphosphine, tris (p-methoxyphenyl)phosphine, tris (p-chlorophenyl)phosphine, tetraphenyldiphosphine, tris (dimethylamino)phosphine, p,p'-ethylene bis (diphenylphosphine), p,p'-trimethylene bis (diphenylphosphine), 1,4-diphosphabicyclo [2.2.2] octane, trimethylarsine, triethylarsine, tricyclohexylarsine, triphenylarsine, tri-p-tolylarsine, tetraphenyldiarsine, triphenylstibine, tripropylstibine and tributylstibine.

It is of considerable advantage to use the aforesaid phosphorus, arsenic or antimony compounds in much more than are equivalent amounts by weight since they stabilize the palladium catalyst, preventing it from separating out as metallic palladium. By using an excess of the phosphine, arsine or stibine compounds a smaller amount of palladium exhibits a significantly increased activity and hence reduces the catalyst cost. Also by using an excess of the ligand the metallic palladium does not separate out and reuse of the catalyst is possible. If the phosphorus, arsenic or antimony compound is used in a considerable excess in the present invention and has a high boiling point it will remain in the reaction mixture after distilling off the product and can be used repeatedly.

The process of the present invention is especially effective in the copresence of a base or reducing agent. These additives are especially effective when zero-valent palladium or platinum catalyst or the same tending to become zero-valent are used. It is preferable to use as the base a lithium, sodium, potassium, rubidium and cesium salts of the nitro compound which is used as one of the starting materials. These alkali metal salts need not be added in salt form but can be formed in situ in the reaction system. The alkali metal salts can be formed by adding a predetermined amount of a basic alkali metal salt to the starting nitro material and converting a portion of the starting material into the corresponding alkali metal salt. As the basic alkali metal salt for this purpose the compounds of the formula R″—OMe

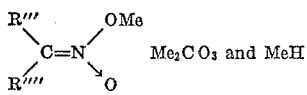 Me₂CO₃ and MeH are preferably used wherein R″, R‴ and R⁗ are preferably selected from the group consisting of aliphatic groups having 1–6 carbon atoms, alicyclic or aromatic group having 6–12 carbon atoms. R″, R‴ and R⁗ are not limited thereto and each hydrogen atom may be replaced with additional groups not adversely affecting the reaction. Me in the above formula stands for an alkali metal. Suitable basic compounds are for example, C₆H₅ONa, C₆H₅OLi, C₆H₅OK, C₆H₅OCs, p-Cl—C₆H₄ONa, m-Cl—C₆H₄—ONa, o-Cl—C₆H₄ONa, p-CH₃C₆H₄ONa, m-CH₃—C₆H₄OK, p-NO₂C₆H₄ONa, p-C₆H₅—C₆H₄—ONa, C₆H₁₁ONa, CH₃ONa, C₂H₅ONa, C₂H₅ORb, CH₂=CH—CH₂ONa, n-C₄H₉OK, t-C₄H₉ONa,

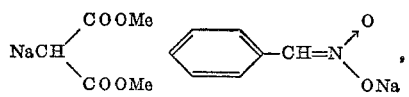

K₂CO₃, NaH, KH, PhLi and CH₃CH₂CH₂CH₂Li.

As a reducing agent, any reducing agent may be employed which is capable of lowering the valence of palladium or platinum which is the main metal of the catalyst. Specifically the following examples may be cited.

NH₂—NH₂, LiAlH₄, NaBH₄, EtZnBr, Grignard's reagent

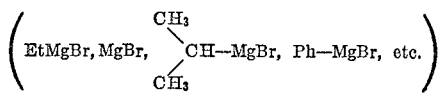

Et₂Zn, Et₂Cd, (CH₃)₄Pb, (Et)₃Al, Et₂AlCl, EtAlCl₂, Et₂Al(OMe) and HSiCl₃. However, the reducing agents suitable for employment in the present invention are not limited to those noted above.

It is also possible to use as the catalyst in the present invention, a palladium or platinum catalysts together with a stabilizer. Catalysts of this type which deserve particular attention are for example

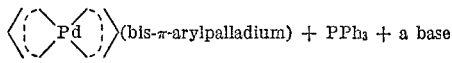(bis-π-arylpalladium) + PPh₃ + a base

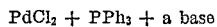 PdCl₂ + PPh₃ + a base

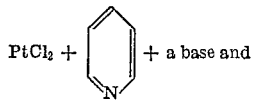 PtCl₂ + + a base and

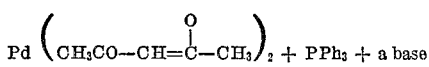 + PPh₃ + a base

The practice of the process of the present invention is very simple. It is carried out by mixing the catalyst into the nitro compound and adding thereto the conjugated diene. The addition of a solvent is not required. However, a solvent which imparts a positive influence on the reaction which does not adversely effect the reaction, may be used. As such solvent, hexane, heptane, cyclohexane, benzene, toluene, xylene, isopropanol, n-butanol, sec-butanol, tert-butanol, isoamyl alcohol and cyclohexanol may be cited.

When a small amount of an alcohol or a phenol is added to the reaction mixture, the catalytic activity is increased and the reaction proceeds rapidly. It is therefore preferable to add an alcohol or a phenol in an amount of 0.1–10 times the palladium compound or the platinum compound (based on the molar ratio) to the reaction mixture. As such alcohols, methanol, ethanol, propanol, isopropanol, butanol, isobutanol, isoamyl alcohol and benzyl alcohol and as such phenols, phenol, chlorophenol, dichlorophenol, trichlorophenol, bromophenol, cresol, xylenol, nitrophenol and hydroquinone are preferably used. When an alkali metal alkoxide or phenoxides are used, an alcohol or phenol corresponding to the alkali metal are formed and accordingly an alcohol or phenol need not be added. When a base is concurrently used, there is no particular limitation as to the ratio of each component comprising the catalyst. However, normally it is of advantage to use the base in an amount of 0.1–1000 times, preferably 1–100 times based on the moles of the palladium or platinum compound. The molar ratio of the nitro compound of the formula

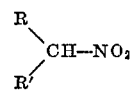

to the palladium or platinum compound is 10–100,000 times, preferably 50–5,000 times. There is no particular limitation as to the molar ratio of the conjugated diene to the nitro compound of the formula

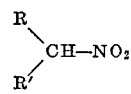

however, it is advantageously 0.1–20 times and preferably 0.3–9 times.

There is no particular limitation to the ratio of the trivalent phosphorus, arsenic or antimony compound. It is, however necessary to add to palladium the trivalent phosphorus, arsenic or antimony compound in an amount more than the amount which will coordinate with the palladium. When there is no coordination an amount more than an equimolar amount, is added in order to obtain a substantial improved effect. It is advantageous to use more than 10 times and more especially 15–800 times moles based on the palladium. There is no particular upper limit, however, normally it should not exceed 2000 times moles. When the ratio of the trivalent phosphorus, arsenic or anitmony compound to the nitro compound is more than 0.001 mole the most preferable results are obtained.

The reaction temperature should be 0–200° C., and preferably from room temperature to 120° C.

When a nitro compound of the formula

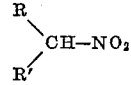

is employed in the process of the present invention, wherein R or R′ is H, three compounds are obtained. The carbon atom alpha to the nitro compound, may have one alkadienyl group, two alkadienyl groups or three alkadienyl groups substituents. The ratios of each of these products can be controlled by the amount of the conjugated diene and the reaction conditions employed.

The unsaturated nitro compounds obtained in accordance with the present invention are highly useful compounds. They may be used in the manufacture of polymers and as intermediates for various organic chemicals and particularly as an intermediate for a plasticizer or a surface active agent. The nitro compounds of this invention are especially useful for the preparation of the corresponding long chain primary amine by reduction of the nitro group.

The unsaturated nitro compound obtained by the above described process may be subsequently reduced according to known method for reducing nitro groups and converted into the corresponding saturated or unsaturated long chain primary amine.

The reduction of the nitro group can be easily carried out by well known methods such as catalytic reduction or a chemical reduction using various hydrides or nascent hydrogen.

The catalytic reduction can be carried out by a well known method using as the catalyst, Raney nickel, palladium-carbon, Urushibara nickel, Adams platinum oxide or copper-chromium oxide. The nitro compound is reduced in a hydrogen gas atmosphere preferably at a temperature of 0–200° C. under a pressure of 1–300 atmospheres. The catalytic reduction of the nitro group also causes a reduction of the olefinic double bonds so that the final compound becomes a saturated primary amine.

As reducing agent in the chemical reduction, the well known reducing agents normally used in the chemical reduction of nitro group may be employed. Specific examples of preferred reducing agents are iron-hydrochloric acid, tin-hydrochloric acid, zinc-hydrochloric acid, iron-acetic acid, iron-diluted sulfuric acid, stannous chloride-hydrochloric acid and lithium aluminum hydride. However, the reducing agent is of course not limited to above named materials. By chemical reduction the double bonds are not reduced with only the nitro groups being reduced. Using the chemical reduction method, it is possible to obtain unsaturated amines having terminal double bonds which are especially useful in polymer.

The reaction conditions used in the chemical reduction are similar to those customarily employed. For example, in case of using a metal and an acid, the nitro compound is added to a mixture containing a large excess of the metal and a large excess of the acid and the resulting mixture reacted. The reaction will proceed at room temperature. However, it is possible to increase the reaction rate by heating. As the acid, normally hydrochloric acid is used, however, other mineral acids and organic acids may also be used. After the reaction, the liquid is made alkaline to separate out the amine. In case of reducing with lithium aluminum hydride, the nitro compound is dissolved in a solvent, for example, ether, tetrahydrofuran, dioxane, dimethoxy ethane or pyridine. The lithium aluminum hydride is added and the resulting mixture is reacted at room temperature or at an elevated temperature.

The saturated and unsaturated long chain primary amines of this invention have a characteristic structure which is different from the structure of conventional long chain primary amine obtained from fats and oils and have properties which make them especially useful as starting material for polymers, as intermediates for surface active agents or as an intermediate for various other organic chemicals.

The following examples are given by way of illustration and are not intended to limit the scope of the subjoined claims. All parts are parts by weight not parts by volume unless otherwise indicated.

EXAMPLE 1

A 100 cc. autoclave was charged with 0.5 g. of dichlorobis(triphenylphosphine)palladium, 1.0 g. of sodium phenoxide, 15.2 g. (0.20 mole) of nitroethane and 25 cc. of isopropanol. After replacing air inside the autoclave with nitrogen, 70 cc. (0.80 mole) of liquefied 1,3-butadiene was added and the resulting mixture was stirred at 24° C. for 41 hours. By distillation under a reduced pressure, 8 g. of 9-nitro-1,6-decadiene

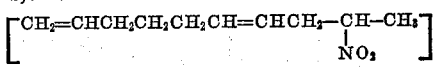

(boiling point: 102° C./5 mm. Hg), 1 g. of 3-(1-nitroethyl)-1,7-octadiene

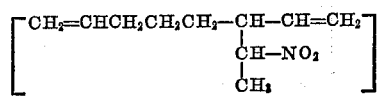

(boiling point: 97° C./5 mm. Hg) and 40 g. of 9-methyl-9-nitro-1,6,11,16-heptadecatetraene

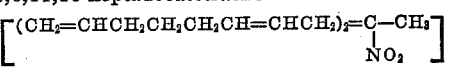

(boiling point: 125° C./0.01 mm. Hg) were obtained, respectively.

EXAMPLE 2

A 100 cc. autoclave was charged with 0.50 g. of dichlorobis(triphenylphosphine)palladium, 0.8 g. (6.9 mmoles) of sodium phenoxide, 12.2 g. (0.20 mole) of nitromethane and 25 cc. of isopropanol. After replacing air inside the autoclave by nitrogen, 35 cc. (0.4 mole) of liquefied 1,3-butadiene was added and the resulting mixture was stirred at 25° C. for 15 hours. After recovering 3.5 g. of the unreacted nitromethane, when the content was distilled under a reduced pressure, 2.5 g. of 9-nitro-1,6-nonadiene

[CH$_2$=CHCH$_2$CH$_2$CH$_2$CH=CH—CH$_2$—CH$_2$NO$_2$]

(boiling point: 120° C./0.008 mm. Hg), 3 g. of 9-nitro-10-yl)-1,7-octadiene

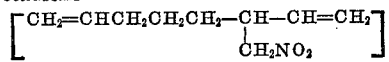

(boiling point: 95° C./5 mm. Hg), 15 g. of 9-nitro-1,6,11,16-heptadecatetraene

[(CH$_2$=CHCH$_2$CH$_2$CH=CHCH$_2$)$_2$—CH—NO$_2$]

(boiling point: 120° C./0.008 mm. Hg), 3 g. of 9-nitro-10-vinyl-1,6,14-pentadecatriene

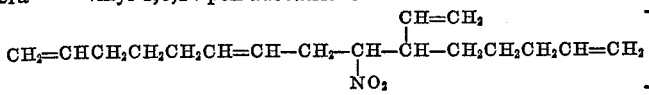

(boiling point: 114° C./0.008 mm. Hg) and 6 g. of 9-nitro-9-(2,7-octadienyl) 1,6,11,16-heptadecatetraene

[(CH$_2$=CHCH$_2$CH$_2$CH$_2$CH=CH—CH$_2$)$_3$—C—NO$_2$]

(boiling point: 177° C./0.008 mm. Hg) were obtained, respectively.

EXAMPLE 3

A 100 cc. autoclave was charged with 0.40 g. (0.5 mmole) of dichlorobis(triphenylphosphite)palladium, PdCl$_2$ [P(OC$_6$H$_5$)$_3$]$_2$, 0.48 g. (5 mmoles) of sodium-tert-butoxide and 50 g. (0.39 mole) of nitrocyclohexane. After replacing air inside the autoclave with nitrogen, 25 cc. (0.28 mole) of liquefied 1,3-butadiene was added to the content and the resulting mixture was stirred at 23° C. for 60 hours. After recovering 45 g. of the unreacted nitrocyclohexane, when the content was distilled under a reduced pressure, 3 g. of 8-(1-nitrocyclohexyl)-1,6-octadiene

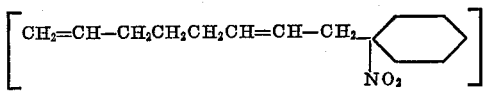

(boiling point: 140° C./5 mm. Hg) was obtained.

EXAMPLES 4–54

Example 1 was repeated except using 0.5 mmole of various palladium or platinum compounds instead of dichlorobis(triphenylphosphine). The results are shown in Table 2.

The physical and chemical data of unsaturated nitro compounds are shown in Table 1.

TABLE 1.—PHYSICAL AND CHEMICAL DATA OF MAIN UNSATURATED NITRO COMPOUNDS

| | 9-nitro-1,6-nonadiene (CH₂NO₂) | 3-(nitromethyl)-1,7-octadiene (CH₂NO₂) | 9-nitro-1,6-decadiene (CH-NO₂, CH₃) | 9-nitro-1,6-undecadiene (CH-NO₂, C₂H₅) |
|---|---|---|---|---|
| Molecular weight | Observed: 169<br>Calculated: 169.22 | Observed: 168<br>Calculated: 169.22 | Observed: 183<br>Calculated: 183.24 | Observed: 198<br>Calculated: 197.27 |
| Elemental analysis | | C   H   N<br>Observed: 63.97  8.86  8.22<br>Calculated: 63.88  8.94  8.28 | C   H   N<br>Observed: 63.75  8.90  8.32<br>Calculated: 63.88  8.94  8.28 | C   H   N<br>Observed: 65.78  9.39  7.62<br>Calculated: 65.54  9.35  7.64 | C   H   N<br>Observed: 66.81  9.90  7.13<br>Calculated: 66.97  9.71  7.10 |
| Infrared absorption spectrum | 910(s), 968(s), 990(m), 1,380(s), 1,435(s), 1,388(m), 1,400(s), 1,550(vs), 1,649(m), 2,860(m), 2,935(s), 3,080(w) | 910(s), 968(s), 990(m), 1,420(m), 1,435(m), 1,460(m), 1,550(m), 1,640(s), 2,860(m), 2,935(s), 3,080(m) | 860(w), 910(s), 965(s), 990(m), 1,360(m), 1,387(s), 1,450(s), 1,550(vs), 1,640(m), 2,900(m), 2,950(m), 3,010(m), 3,080(w) | 850(w), 910(s), 968(s), 990(m), 1,325(m), 1,345(m), 1,370(s), 1,440(s), 1,460(m), 1,550(vs), 1,640(m), 2,850(m), 2,920(s), 2,980(s), 3,080(s) |
| NMR spectrum | In the vicinity of 1.5 p.p.m. 2H<br>2.0 p.p.m. 4H<br>2.67 p.p.m. 2H<br>4.33 p.p.m. (triplet J=7 cps.) 2H<br>4.8~5.2 p.p.m. 4H<br>5.3~5.9 p.p.m. 3H | In the vicinity of 1.45 p.p.m. 4H<br>2.0 p.p.m. 2H<br>3.0 p.p.m. 1H<br>4.29 p.p.m. (doublet J=7 cps.) 2H<br>4.8~5.2 p.p.m. 4H<br>5.4~6.0 p.p.m. 2H | 1.48 p.p.m. (doublet J=7 cps.) 3H<br>In the vicinity of 1.98 p.p.m. 4H<br>2.47 p.p.m. (triplet J=6 cps.) 2H<br>4.47 p.p.m. (quartet J=6.5 cps.) 1H<br>4.8~5.15 p.p.m. 2H<br>5.25~5.85 p.p.m. 3H | 0.95 p.p.m. (triplet J=7 cps.) 3H<br>In the vicinity of 1.5 p.p.m. 2H<br>In the vicinity of 1.95 p.p.m. 2H<br>2.47 p.p.m. 2H<br>4.22 p.p.m. 1H<br>4.8~5.15 p.p.m. 2H<br>5.25~5.8 p.p.m. 3H |

| | 9-methyl-9-nitro-1,6,11,16-heptadecatetraene (CH₃, C, NO₂) | 9-ethyl-9-nitro-1,6,11,16-heptadecatetraene (C₂H₅, C, NO₂) | 9-nitro-9(2,7-octadienyl)-1,6,11,16-heptadecatetraene (C, NO₂) |
|---|---|---|---|
| Molecular weight | Observed: 290<br>Calculated: 291.42 | Observed: 306<br>Calculated: 305.45 | Observed: 383<br>Calculated: 385.57 |
| Elemental analysis | C   H   N<br>Observed: 74.21  10.02  4.88<br>Calculated: 74.18  10.03  4.81 | C   H   N<br>Observed: 74.68  10.28  4.62<br>Calculated: 74.71  10.23  4.59 | C   H   N<br>Observed: 77.94  10.17  3.63<br>Calculated: 77.87  10.20  3.63 |
| Infrared absorption spectrum | 850(w), 910(s), 970(s), 990(m), 1,350(m), 1,385(w), 1,400(s), 1,455(m), 1,540(vs), 1,640(vs), 2,850(m), 2,980(s), 3,075(w) | 850(w), 910(s), 970(s), 990(m), 1,365(m), 1,385(w), 1,400(s), 1,540(vs), 1,640(m), 2,860(m), 2,980(s), 3,075(w) | 850(w), 910(s), 970(s), 990(m), 1,350(w), 1,440(s), 1,540(s), 1,640(m), 2,850(m), 2,930(s), 2,980(s), 3,070(w) |
| NMR spectrum | 1.43 p.p.m. (singlet) 3H<br>1.5 p.p.m. 4H<br>2.0 p.p.m. 8H<br>2.43 p.p.m. (doublet J=7 cps.) 2H<br>2.53 p.p.m. (doublet J=7 cps.) 2H<br>4.8~5.1 p.p.m. 4H<br>5.2~5.9 p.p.m. 6H | 0.86 p.p.m. (triplet J=6 cps.) 3H<br>1.44 p.p.m. (quintet J=6 cps.) 4H<br>1.99 p.p.m. 10H<br>2.52 p.p.m. (doublet J=7 cps.) 4H<br>4.84~5.09 p.p.m. 4H<br>5.18~5.92 p.p.m. 6H | 1.44 p.p.m. 6H<br>1.99 p.p.m. 12H<br>2.46 p.p.m. (doublet J=7 cps.) 6H<br>4.8~5.05 p.p.m. 6H<br>5.2~5.9 p.p.m. 9H |

TABLE 2

| | | Product (g.) | |
|---|---|---|---|
| | | $CH_2=CHCH_2CH_2CH_2CH=CHCH_2CHCH_3$, with $NO_2$ substituent | $(CH_2=CHCH_2CH_2CH_2CH=CHCH_2)_2C-CH_3$, with $NO_2$ substituent |
| Ex. | Palladium or platinum compound | 9-nitro-1,6-decadiene | 9-methyl-9-nitro-1,6,11,16-heptadecatetraene |
| 4 | $PdCl_2$ | 11 | 19 |
| 5 | $Pd(NO_3)_2$ | 14 | 22 |
| 6 | $Pd(CNS)_2$ | 8 | 15 |
| 7 | $Pd(CN)_2$ | 10 | 17 |
| 8 | $Pd(OCOCH_3)_2$ | 15 | 18 |
| 9 | $K_2PdCl_4$ | 6 | 12 |
| 10 | $Na_2PdCl_4$ | 12 | 20 |
| 11 | $PdCl_2(PCl_3)_2$ | 10 | 30 |
| 12 | $PdCl_2[P(OCH_3)_3]_2$ | 7 | 42 |
| 13 | $PdCl_2[P(cycloC_6H_{11})_3]_2$ | 6 | 44 |
| 14 | $Pd(CNS)_2[P(C_4H_9)_3]_2$ | 11 | 30 |
| 15 | $Pd(NO_3)_2[P(C_6H_5)_3]_2$ | 10 | 43 |
| 16 | $PdCl_2[As(C_4H_9)_3]_2$ | 12 | 55 |
| 17 | $PdCl_2[As(C_6H_5)_3]_2$ | 10 | 34 |
| 18 | $PdBr_2[Sb(C_3H_7)_3]_2$ | 14 | 30 |
| 19 | $PdCl_2[Sb(C_6H_5)_3]_2$ | 8 | 25 |
| 20 | $CH_3COPdCl[P(C_2H_5)_3]_2$ | 10 | 28 |
| 21 | $C_6H_5COPdCl[P(C_6H_5)_3]_2$ | 13 | 30 |
| 22 | $CH_3PdBr[P(C_6H_5)_3]_2$ | 12 | 32 |
| 23 | $(CH_3)_2Pd[P(C_2H_5)_3]_2$ | 10 | 34 |
| 24 | $Pd[P(C_6H_5)_3]_2+$  | 12 | 36 |
| 25 | $Pd[P(C_6H_5)_3]_2+$ $HC-COOMe$ / $HC-COOMe$ | 9 | 39 |
| 26 | $Pd[P(C_6H_5)_3]_2+$ 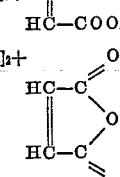 | 11 | 40 |
| 27 | $PdCl_2[P(OC_6H_5)_3]_2$ | 8 | 42 |
| 28 | $Pd(\pi-C_3H_5)ClP(C_6H_5)_3$ | 7 | 44 |
| 29 | Pd acetyl acetonate | 14 | 30 |
| 30 | $Pd(CO)Cl_2$ | 18 | 25 |
| 31 | $PdCl_2[$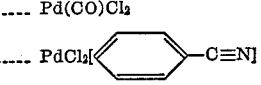$-C\equiv N]$ | 17 | 27 |
| 32 | $Pd(\pi-C_3H_5)_2$ | 15 | 28 |
| 33 | $Pd_2Cl_2(\pi-C_3H_5)$ | 18 | 20 |
| 34 | $[PdCl_2(CH_2=CH_2)]_2$ | 17 | 20 |
| 35 | $[PdCl_2C_6H_5CH=CH]_2$ | 19 | 10 |
| 36 | $PdCl_2[CH_2=CH-CH=CH_2]$ | 16 | 22 |
| 37 | $PdCl_2$  | 14 | 27 |
| 38 | $H_2PtCl_4 \cdot 6H_2O$ | 10 | 18 |
| 39 | $K_2PtCl_4$ | 13 | 21 |
| 40 | $K_2PtCl_6$ | 12 | 20 |
| 41 | $Na_2PtCl_6 \cdot 6H_2O$ | 10 | 15 |
| 42 | $[Pt(P(C_2H_5)_3)_4][PtCl_4]$ | 15 | 10 |
| 43 | $[Pt(P(OC_2H_5)_3)_4]Cl_2$ | 20 | 20 |
| 44 | $PtCl_2[As(C_4H_9)_3]_2$ | 17 | 15 |
| 45 | $PtCl_2[Sb(C_6H_5)_3]_2$ | 14 | 16 |
| 46 | $Pt[P(C_6H_5)_3]_2+$  | 12 | 25 |
| 47 | $Pt[P(C_6H_5)_3]_2+$ $HC-COOMe$ / $HC-COOMe$ | 15 | 27 |
| 48 | $PtCl(\pi-C_3H_5)P(C_6H_5)_3$ | 16 | 29 |
| 49 | $C_2H_5PtCl[P(C_6H_5)_3]_2$ | 10 | 20 |
| 50 | $Pt(\pi-C_3H_5)_2$ | 11 | 18 |
| 51 | $KPtCl_3(CH_2=CH_2)$ | 8 | 14 |
| 52 | $KPtCl_3(CH_3-CH=CH_2)$ | 10 | 13 |
| 53 | $PtCl_2[P(OC_6H_5)_3]_2$ | 15 | 32 |
| 54 | $PtCl_2[P(C_6H_5)_3]_2$ | 12 | 35 |

EXAMPLES 55-67

The results of carrying out a reaction of 1-nitropropane with butadiene using various palladium catalysts, various bases, reducing agents and solvents are shown as Examples 55-67 in Table 3.

TABLE 3

| Ex. | Catalyst (g.) | Base or reducing agent (g.) | Solvent (cc.) | 1-nitropropane (g.) | Butadiene (cc.) | Reaction temperature (°C.) | Reaction time (hr.) | 9-nitro-1,6-undecadiene (g.) | 9-ethyl-9-nitro-1,6,11,16-heptadecatetraene (g.) | Additive (g.) |
|---|---|---|---|---|---|---|---|---|---|---|
| 55 | PdCl$_2$(PPh$_3$)$_2$ 0.3 | C$_6$H$_5$OLi 0.5 | C$_6$H$_5$CH$_3$ (toluene) 25 | 20 | 40 | 30 | 17 | 30 | 4 | No. |
| 56 | PdCl$_2$(PPh$_3$)$_2$ 0.2 | NaH 0.2 | C$_6$H$_{14}$ 25 | 12 | 20 | 70 | 4 | 10 | 1 | No. |
| 57 | PdCl$_2$(PPh$_3$)$_2$ 0.2 | Na$_2$CO$_3$ 0.5 | C$_6$H$_5$CH$_3$ 25 | 12 | 20 | 50 | 7 | 8 | 0.5 | No. |
| 58 | PdCl$_2$(PPh$_3$)$_2$ 0.5 | C$_2$H$_5$ORb 1.0 | C$_6$H$_6$ 25 | 10 | 20 | 70 | 3 | 12 | 1 | No. |
| 59 | PdCl$_2$(PPh$_3$)$_2$ 0.5 | p-Cl-C$_6$H$_4$ONa 1.0 | C$_6$H$_{11}$OH (cyclohexanol) 25 | 20 | 80 | 25 | 40 | 4 | 58 | No. |
| 60 | PdCl$_2$(PPh$_3$)$_2$ 0.5 | CH$_3$CH=N(ONa)→O 1.0 | CH$_2$CH$_2$CH(OH)—CH$_3$ 25 | 20 | 40 | 25 | 30 | 31 | 2 | No. |
| 61 | PdCl$_2$(PPh$_3$)$_2$ 0.2 | CH$_2$=CHCH$_2$ONa 0.4 | (CH$_3$)$_3$C—OH 25 | 10 | 18 | 100 | 2 | 13 | 0.5 | No. |
| 62 | PdCl$_2$(Ph$_2$PCH$_2$CH$_2$PPh$_2$) 0.4 | NaBH$_4$ 0.6 | C$_6$H$_6$ 25 | 12 | 18 | 70 | 6 | 9 | 2 | No. |
| 63 | PdCl$_2$(PPh$_3$)$_2$ 0.3 | n-BuLi 0.8 | C$_6$H$_6$ 25 | 15 | 20 | 30 | 15 | 15 | 1 | No. |
| 64 | PdCl$_2$(PPh$_3$)$_2$ 0.3 | Et$_2$Al(OMe) 0.6 | C$_6$H$_5$CH$_3$ 25 | 15 | 18 | 80 | 8 | 8 | 1.5 | No. |
| 65 | PdCl$_2$(2,2'-bipyridyl) 0.3 | NH$_2$NH$_2$·H$_2$O 0.1 | C$_6$H$_6$ 25 | 15 | 18 | 70 | 7 | 10 | 1 | No. |

TABLE 3—Continued

| 66 | 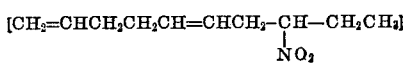 0.18 | NaOPh 0.8 | CH₃\CH—OH/CH₃ 25 | 18 | 70 | 25 | 40 | 2 | 57 | PPh₃ 0.26 |
|---|---|---|---|---|---|---|---|---|---|---|
| 67 | 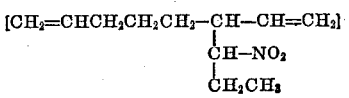 0.18 | KOPh 0.8 | CH₃CH₂CH₂CH₂OH 25 | 18 | 35 | 30 | 25 | 27 | 2 | PPh₃ 0.52 |

EXAMPLE 68

A 200 cc. autoclave was charged with 0.50 g. of dichlorobis(triphenylphosphine)palladium, 1.0 g. of sodium phenoxide, 12.2 g. of nitromethane and 25 cc. of isopropanol. After replacing air inside the autoclave by nitrogen, 120 cc. of liquefied 1,3-butadiene was added to the content and the resulting content was stirred at 24° C. for 60 hours. When the content was distilled under a reduced pressure, 2 g. of 9-nitro-10-vinyl-1,6,14-pentadecatriene, 3 g. of 9-nitro-1,6,11,16-heptadecatetraene, 52 g. of 9-nitro-9-(2,7-octadienyl)-1,6,11,16-heptadecatetraene and 8 g. of 9-nitro-9-(1-vinyl-5-hexenyl)-1,6,11,16-heptadecatetraene were obtained, respectively.

EXAMPLE 69

A 100 cc. autoclave was charged with 0.50 g. of dichlorobis(triphenylphosphine)palladium, 0.60 g. of sodium phenoxide, 50 g. of 1-nitropropane and 24 g. of isoprene. The mixture was stirred at 30° C. for 60 hours. After recovering 45 g. of the unreacted 1-nitropropane, the content was distilled under a reduced pressure to obtain 5 g. of 2,7-dimethyl-9-nitro-1,6-undecadiene and 2 g. of 9-ethyl-2,7,11,16-tetramethyl-9-nitro-1,6,11,16-heptadecatetraene, respectively.

EXAMPLE 70

A 100 cc. autoclave was charged with 0.50 g. of dichlorobis(triphenylphosphine)palladium, 0.70 g. of sodium phenoxide, 18 g. of 1-nitro propane, 33 g. of 2,3-dimethyl-1,3-butadiene and 25 cc. of sec-butanol. The reaction mixture was stirred at 30° C. for 25 hours. The content was distilled under reduced pressure to give 2,3,6,7-tetramethyl-9-nitro-1,6-undecadiene (20 g.).

EXAMPLE 71

A 100 cc. autoclave was charged with 0.4 g. of dichlorobis(triphenylphosphine)palladium, 0.70 g. of sodium phenoxide, 15.2 g. of nitroethane, 27.2 g. of 1,3-pentadiene and 25 cc. of isopropanol. The content was stirred at 25° C. for 20 hours.

The content was distilled under a reduced pressure to obtain 23 g. of 4,8-dimethyl-9-nitro-1,6-decadiene.

EXAMPLE 72

A 100 cc. autoclave was charged with 0.50 g. of dichlorobis(triphenylphosphine)palladium, 1.0 g. of sodium phenoxide, 19.7 g. of sodium phenoxide, 19.7 g. of 9-nitro-1,6-undecadiene and 25 cc. of isopropanol. After replacing air inside the autoclave by nitrogen, 25 cc. of liquefied 1,3-butadiene was added to the content and the resulting content was stirred at 25° C. for 15 hours. The content was distilled under a reduced pressure to obtain 28 g. of 9-ethyl-9-nitro-1,6,11,16-heptadecatetraene.

EXAMPLE 73

A 100 cc. autoclave was charged with 0.50 g. of dichlorobis(triphenylphosphine)palladium, 0.9 g. of sodium phenoxide, 13.7 g. of phenylnitromethane and 25 cc. of isopropanol. After replacing air inside the autoclave, 35 cc. of liquefied 1,3-butadiene was added to the reaction mixture and the resulting content was stirred at 25° C. for 30 hours. The content was distilled under a reduced pressure to obtain 30 g. of 9-nitro-9-phenyl-1,6,11,16-heptadecatetraene.

EXAMPLE 74

A 100 cc. autoclave was charged with 0.50 g. (0.7 mmole) of dichlorobis(triphenylphosphine)palladium, 1.0 g. (8.6 mmoles) of sodium phenoxide and 50 g. (0.56 mole) of 1-nitropropane. After replacing air inside the autoclave by nitrogen, 25 cc. (0.28 mole) of liquefied 1,3-butadiene was added to the reaction mixture and the resulting mixture was stirred at 25° C. for 21 hours. After recovering 41 g. of the unreacted 1-nitropropane, when the content was distilled under a reduced pressure, 15.5 g. of 9-nitro-1,6-undecadiene $$[CH_2=CHCH_2CH_2CH=CHCH_2-\underset{NO_2}{\overset{|}{CH}}-CH_2CH_3]$$

(boiling point: 115° C./5 mm. Hg) and 1.0 g. of 3-(1-nitropropyl)-1,7-octadiene $$[CH_2=CHCH_2CH_2CH_2-\underset{\underset{CH_2CH_3}{\overset{|}{CH-NO_2}}}{\overset{|}{CH}}-CH=CH_2]$$

(boiling point: 107° C./5 mm. Hg) were obtained.

A 200 cc. atuoclave was charged with 10 g. of 9-nitro-1,6-undecadiene obtained in the foregoing reaction, 1 g. of 5% palladium-carbon and 20 cc. of ethanol. After replacing air inside the autoclave by hydrogen, hydrogen was fed into the autoclave until a pressure of 100 kg./cm.² was obtained. The content was stirred at 40° C. for 15 hours. The content was distilled under a reduced pressure to obtain 7.5 g. of 1-ethylnonylamine of the formula

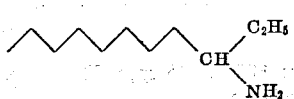

Elemental analysis.—Observed (percent): C, 77.06; H, 14.66; N, 8.17. Calculated (percent): C, 77.11; H, 14.71; N, 8.14.

Molecular weight.—Observed: 172. Calculated: 171.3.

Infrared absorption spectrum (cm.⁻¹): 720(w.), 810(w.), 1250(w.), 1275(w.), 1380(w.), 1470(m.), 1600(m.), 2850(s.), 2910(s.), 3250(w.).

NMR spectrum:
P.p.m.:
- 0.90 _____ 6H
- 1.26 _____ 16H
- 1.56 _____ 2H
- 2.50 _____ 1H (boiling point: 90° C./7 mm. Hg).

EXAMPLE 75

A 100 cc. autoclave was charged with 0.5 g. of dichlorobis(triphenylphosphine)palladium, 10 g. of sodium phenoxide, 17.8 g. (0.20 mole) of 2-nitropropane and 25 cc. of isopropanol. After replacing air inside the autoclave by nitrogen, 35 cc. (0.40 mole) of liquefied 1,3-butadiene was added to the content and the resulting content was stirred at 25° C. for 20 hours. The content was distilled under a reduced pressure to obtain 36 g. of 9-methyl-9-nitro-1,6-decadiene

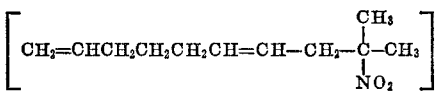

(boiling point: 100° C./5 mm. Hg).

A 200 cc. autoclave was charged with 10 g. of 9-methyl-9-nitro-1,6-decadiene obtained in the foregoing reaction, 1.5 g. of Raney nickel and 20 cc. of ethanol. After replacing air inside the autoclave by hydrogen, hydrogen was pressed into the autoclave at 100 kg./cm.$^2$ and the content was stirred at 40° C. for 12 hours. The content was distilled under a reduced pressure to obtain 7.7 g. of 1,1-dimethylnonylamine of the formula

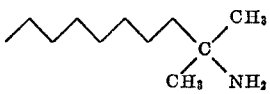

*Elemental analysis.*—Observed (percent): C, 77.03; H, 14.83; N, 8.04. Calculated (percent): C, 77.11; H, 14.71; N, 8.14.

Molecular weight.—Observed: 173. Calculated: 171.3.
Infrared absorption spectrum (cm.$^{-1}$): 720(w.), 820(w.), 1360(w.), 1380(w.), 1460(w.), 1595(w.), 2850(s.), 2926(s.), 3250(w.).

NMR spectrum:

P.p.m.:
| | |
|---|---|
| 0.89 | 3H |
| 1.02 | 6H |
| 1.14 | 2H |
| 1.29 | 24H |

(boiling point: 98° C./15 mm. Hg).

EXAMPLE 76

A 100 cc. autoclave was charged with 0.5 g. of dichlorobis(triphenylphosphine)palladium, 1.0 g. of sodium phenoxide, 15.2 g. (0.20 mole) of nitroethane and 25 cc. of isopropanol. After replacing air inside the autoclave, 70 cc. (0.80 mole) of liquefied 1,3-butadiene was added to the content and the resulting content was stirred at 24° C. for 41 hours. The content was distilled under a reduced pressure to obtain 8 g. of 9-nitro-1,6-decadiene

[CH$_2$=CHCH$_2$CH$_2$CH$_2$CH=CHCH$_2$—CH—CH$_3$]
                                            |
                                           NO$_2$ (boiling point: 102° C./5 mm. Hg), 1 g. of 3-(1-nitroethyl)-1,7-octadiene

[CH$_2$=CHCH$_2$CH$_2$CH$_2$—CH—CH=CH$_2$]
                              |
                             CH—NO$_2$
                              |
                             CH$_3$ (boiling point: 97° C./5 mm. Hg) and 40 g. of 9-methyl-9-nitro-1,6,11,16-heptadecatetraene

[(CH$_2$=CHCH$_2$CH$_2$CH$_2$CH=CHCH$_2$)$_2$—C—CH$_3$]
                                              |
                                             NO$_2$ (boiling point: 125° C./0.01 mm. Hg), respectively.

A 300 cc. autoclave was charged with 8 g. of 9-nitro-1,6-decadiene obtained in the foregoing reaction, 1 g. of Raney nickel and 20 cc. of ethanol. After replacing air inside the autoclave by hydrogen, hydrogen was fed into the autoclave until a pressure of 100 kg./cm.$^2$ was obtained and the reaction mixed was stirred at 50° C. for 10 hours. The content was distilled under a reduced pressure to obtain 5.7 g. of 1-methylnonylamine (boiling point: 93° C./20 mm. Hg).

EXAMPLE 77

A 300 cc. autoclave was charged with 10 g. of 9-methyl-9-nitro-1,6,11,16-heptadecatetraene obtained in Example 76, 2 g. of Raney nickel and 20 cc. of ethanol. After replacing air inside the autoclave by hydrogen, hydrogen was fed into the autoclave until a pressure of 100 kg./cm.$^2$ was obtained and the content was stirred at 40° C. for 20 hours. The content was distilled under a reduced pressure to obtain 7.7 g. of 1-methyl-1-octylnonylamine

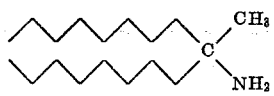

*Elemental analysis.*—Observed (percent): C, 80.33; H, 14.61; N, 5.21. Calculated (percent): C, 80.22; H, 14.59; N, 5.20.

Molecular weight.—Observed: 267. Calculated: 269.50.
Infrared absorption spectrum (cm.$^{-1}$): 720 (w), 820(w), 1380(w), 1467(m), 1610(w.), 2850(s), 2930(s), 3300(w).

NMR spectrum:

P.p.m.:
| | |
|---|---|
| 0.74 | 2H |
| In the vicinity of 0.89 | 6H |
| 0.94 | 3H |
| In the vicinity of 1.26 | 28H |

(boiling point: 138° C./3 mm. Hg).

EXAMPLE 78

A 100 cc. autoclave was charged with 0.50 g. of dichlorobis(triphenylphosphine)palladium, 0.8 g. (6.9 mmole) of sodium phenoxide, 12.2 g. (0.20 mole) of nitromethane and 25 cc. of isopropanol. After replacing air inside the autoclave by nitrogen, 35 cc. (0.4 mole) of liquefied 1,3-butadiene was added to the content and the resulting content was stirred at 25° C. for 15 hours. After recovering 3.5 g. of the unreacted nitromethane, when the content was distilled under a reduced pressure, 2.5 g. of 9-nitro-1,6-nonadiene

[(CH$_2$=CHCH$_2$CH$_2$CH$_2$CH=CHCH$_2$—CH—NO$_2$]

(boiling point: 99° C./5 mm. Hg), 0.9 g. of 3-(nitromethyl)-1,7-octadiene

[CH$_2$=CHCH$_2$CH$_2$CH$_2$—CH—CH=CH$_2$]
                              |
                             CH$_2$NO$_2$ (boiling point: 95° C./5 mm. Hg), 15 g. of 9-nitro-1,6,11,16-heptadecatetraene

[(CH$_2$=CHCH$_2$CH$_2$CH$_2$CH=CHCH$_2$)—CH—NO$_2$]

(boiling point: 120° C./0.008 mm. Hg), 3 g. of 9-nitro-10-vinyl-1,6,14-pentadecatriene

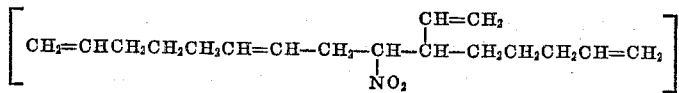

(boiling point: 114° C./0.008 mm. Hg) and 6 g. of 9-nitro-9-(2,7-octadienyl)-1,6,11,16-heptadecatetraene

[(CH$_2$=CHCH$_2$CH$_2$CH$_2$CH=CH—CH$_2$)$_3$—C—NO$_2$]

(boiling point: 177° C./0.008 mm. Hg) were obtained, respectively.

A 100 cc. autoclave was charged with 2 g. of 9-nitro-1,6-nonadiene obtained in the foregoing reaction, 0.5 g. of Adams platinum oxide an d10 cc. of ethanol. After replacing air inside the autoclave by hydrogen, hydrogen was fed into the autoclave until a pressure of 100 kg./cm.$^2$ was obtained and the content was stirred at 50° C. for 7 hours. The content was distilled under a reduced pressure to obtain 1.5 g. of nonylamine.

EXAMPLE 79

A 300 cc. autoclave was charged with 12 g. of 9-nitro-1,6,11,16-heptadecatetraene obtained in Example 78, 2 g. of Raney nickel and 20 cc. of ethanol. After replacing air inside the autoclave by hydrogen, hydrogen was pressed into the autoclave at 100 g./cm.$^2$ and the content was stirred at 40° C. for 15 hours. The content was distilled under a reduced pressure to obtain 9.3 g. of 1-octylnonylamine (boiling point: 125° C./2 mm. Hg).

EXAMPLE 80

A 300 cc. autoclave was charged with 2 g. of 9-nitro-10-vinyl-1,6,14-pentadecatriene obtained in Example 78, 0.5 g. of Raney nickel and 10 cc. of ethanol. After replacing air inside the autoclave by hydrogen, hydrogen was fed into the autoclave until a pressure of 50 kg./cm.$^2$ was obtained and the content was stirred at 45° C. for 10 hours. The content was distilled under a reduced pressure to obtain 1.5 g. of 1-(1-ethylhexyl)nonylamine (boiling point: 120° C./2 mm. Hg).

EXAMPLE 81

A 300 cc. autoclave was charged with 5 g. of 9-nitro-9-(2,7-octadienyl)-1,6,11,16-heptadecatetraene obtained in Example 78, 1 g. of Raney nickel and 15 cc. of ethanol. After replacing air inside the autoclave by hydrogen, hydrogen was fed into the autoclave until a pressure of 100 kg./cm.$^2$ was obtained and the content was stirred at 40° C. for 20 hours. The content was distilled under a reduced pressure to obtain 4.1 g. of 1,1-dioctylnonylamine.

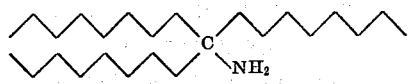

*Elemental analysis.*—Observed (percent): C, 81.90; H, 14.38; N, 3.89. Calculated (percent): C, 81.66; H, 14.53; N, 3.81.

Molecular weight.—Observed: 366. Calculated: 367.68.

Infrared absorption spectrum (cm.$^{-1}$): 720(w.), 810(w.), 1380(w.), 1470(m.), 1610(w.), 2850(s.), 3300(w.).

NMR spectrum:
P.p.m.:
0.88 ------------------------------------- 9H
In the vicinity of 1.27 --------------------- 44H (boiling point: 132° C./4×10$^{-3}$ mm. Hg).

EXAMPLE 82

In a 300 cc. autoclave, 0.18 g. (0.5 mmole) of π-allylpalladium chloride and 0.78 g. (3 mmole) of triphenylphosphine were dissolved in 5 ml. of benzene, thereafter, 0.8 g. (6.9 mmoles) of sodium phenoxide, 77 g. (0.60 mmoles) of nitrocyclohexane and 150 cc. of isopropanol were added. After replacing air inside the autoclave with nitrogen, 35 cc. (0.4 mole) of liquefied 1,3-butadiene was added to the reaction mixture and the resulting mixture was stirred at 70° C. for 3 hours. After recovering 46 g. of the unreacted nitrocyclohexane, when the content was distilled under a reduced pressure, 40 g. of 8-(1-nitrocyclohexyl)-1,6-octadiene

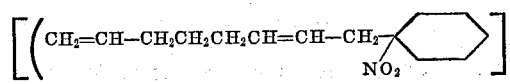

(boiling point: 140° C./5 mm. Hg) was obtained.

A 300 cc. autoclave was charged with 22 g. of 8-(1-nitrocyclohexyl)-1,6-octadiene obtained in the foregoing reaction, 1.5 g. of Raney nickel and 30 cc. of ethanol. After replacing air inside the autoclave by hydrogen, hydrogen was pressed into the autoclave at 120 kg./cm.$^2$ and the content was stirred at 50° C. for 10 hours. The content was distilled under a reduced pressure to obtain 17.2 g. of 1-octylcyclohexylamine of the formula

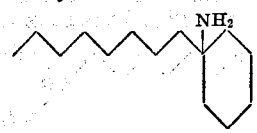

*Elemental analysis.*—Observed (percent): C, 79.25; H, 13.80; N, 6.48. Calculated (percent): C, 79.54; H, 13.83; N, 6.63.

Molecular weight: Observed: 214. Calculated: 211.38.

Infrared absorption spectrum (cm.$^1$): 720(w.), 800(w.), 840(w.), 1375(w.), 1450(m.), 1605(w.), 2850(s), 2930(s.), 3350(w.).

NMR spectrum:
P.p.m.:
0.83 ------------------------------------- 2H
0.91 ------------------------------------- 3H
In the vicinity of 1.30 --------------------- 24H (boiling point: 122° C./3 mm. Hg).

EXAMPLE 83

In a 300 cc. autoclave, 0.18 g. (0.5 mmole) of π-allylpalladium chloride and 0.78 g. (3 mmoles) of triphenylphosphine were dissolved in 5 ml. of benzene, thereafter, 0.8 g. (6.9 mmoles) of sodium phenoxide, 8.9 g. (0.1 mole) of 1-nitropropane and 150 cc. of isopropanol were added thereto. After replacing air inside the autoclave by nitrogen, 40 cc. (0.48 mole) of liquefied 1,3-butadiene was added to the content and the resulting mixture was stirred at 60° C. for 3 hours. The mixture was distilled under a reduced pressure to obtain 3 g. of 9-nitro-1,6-undecadiene $$\left[(CH_2=CHCH_2CH_2CH_2CH=CHCH_2)_2-\underset{NO_2}{\overset{|}{C}}CH_2CH_3\right]$$

(boiling point: 130° C./0.008 mm. Hg), respectively.

A 300 cc. autoclave was charged with 10 g. of 9-ethyl-9-nitro-1,6,11,16-heptadecatetraene obtained in the foregoing reaction, 1 g. of 5% palladium-carbon and 25 cc. of ethanol. After replacing air inside the autoclave by hydrogen, hydrogen was fed into the autoclave until a pressure of 70 kg./cm.$^2$ was obtained and the mixture was stirred at 35° C. for 30 hours. The content was distilled under a reduced pressure to obtain 8.8 g. of 1-ethyl-1-octylnonylamine

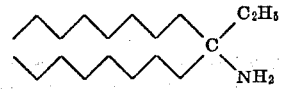

*Elemental analysis.*—Observed (percent): C, 80.59; H, 14.34; N, 4.80. Calculated (percent): C, 80.48; H, 14.50; N, 4.94.

Molecular weight.—Observed: 281. Calculated: 283.53.

Infrared absorption spectrum (cm.$^{-1}$): 720(w.), 810(w.), 1375(w.), 1465(m.), 1610(w.), 2850(s.), 2910(s.), 3350(w.).

MNR spectrum:
P.p.m.:
0.66 ------------------------------------- 2H
0.89 ------------------------------------- 9H
In the vicinity of 1.27 --------------------- 30H (boiling point: 154° C./3 mm. Hg).

EXAMPLE 84

A mixture of 33.5 g. of iron powder, 50 cc. of water and 5 cc. of concentrated hydrochloric acid was heated and refluxed. Thereafter, while stirring the mixture, 18.5 g. of 9-nitro-1,6-undecadiene obtained by the process disclosed in Example 74 and 15 cc. of concentrated hydrochloric acid were added dropwise to the mixture and the resulting mixture was reacted at 100° C. for 5 hours. After filtering the reaction solution, an aqueous solution of caustic soda was added thereto to make it alkaline.

When an organic layer was extracted with ether, dried with anhydrous sodium sulfate and distilled under a reduced pressure, 13.5 g. of 1-ethyl-3,8-nonadienylamine

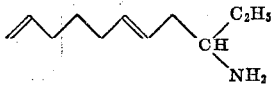

*Elemental analysis.*—Observed (percent): C, 78.85; H, 12.61; N, 8.12. Calculated (percent): C, 78.97; H, 12.65; N, 8.37.

Molecular weight.—Observed: 169. Calculated: 167.29.
Infrared absorption spectrum (cm.$^{-1}$): 830(w.), 910 (m.), 965(m.), 990(w.), 1350(w.), 1380(w.), 1440(w.), 1455(w.), 1610(w.), 1645(w.), 2910(s.), 3070(w.), 3300(w.).

NMR spectrum:
P.p.m.:
```
0.94 ------------------------------------ 3H
1.35 ------------------------------------ 2H
In the vicinity of 1.43 ------------------ 4H
In the vicinity of 2.03 ------------------ 6H
2.62 ------------------------------------ 1H
In the vicinity of 4.94 ------------------ 2H
In the vicinity of 5.40 ------------------ 2H
In the vicinity of 5.70 ------------------ 1H
```
(boiling point: 106° C./14 mm. Hg).

EXAMPLE 85

A mixture of 30 g. of iron powder, 50 cc. of water and 5 cc. of concentrated hydrochloric acid was heated and refluxed, thereafter, while stirring the mixture, 15 g. of 9-methyl-9-nitro-1,6-decadiene obtained by the process disclosed in Example 75 and 15 cc. of concentrated hydrochloric acid were added dropwise thereto and the resulting mixture was reacted at 100° C. for 6 hours. After filtering the reaction solution, an aqueous solution of caustic soda was added thereto to make it alkaline. When the organic layer was extracted with ether, dried with anhydrous sodium sulfate and distilled under a reduced pressure, 8.9 g. of 1,1-dimethyl - 3,8 - nonadienylamine (boiling point: 100° C./14 mm. Hg) was obtained.

EXAMPLE 86

A mixture of 4.8 g. of finely divided tin, 3.7 g. of 9-nitro-1,6-decadiene obtained by the process disclosed in Example 76 and 12 cc. of concentrated hydrochloric acid was stirred at 100° C. for 3 hours. To the obtained solution an aqueous solution of caustic soda was gradually added until it was strongly alkaline. When the organic layer was extracted with ether, dried with anhydrous sodium sulfate and distilled under a reduced pressure, 2.1 g. of 1-methyl-3,8-nonadienylamine (boiling point: 84° C./15 mm. Hg) was obtained.

EXAMPLE 87

To a mixture of 1.5 g. of lithium aluminum hydride and 30 cc. of ether, a mixture of 6.1 g. of 9-ethyl-9-nitro-1,6,11,16-heptadecatetraene obtained by the process disclosed in Example 83 and 20 cc. of ether was added dropwise under reflux. After refluxing for 1 hour dropping, water was added to the resulting mixture to decompose the excess lithium aluminum hydride. The insoluble aluminum hydroxide was dissolved with aqueous solution of diluted caustic soda. Thereafter, the product was extracted with ether. The organic layer was removed, dried with anhydrous sodium sulfate and thereafter it was distilled under a reduced pressure. 4.4 g. of 1-ethyl-1-(2,7-octadienyl)-3,8-nonadienyl amine was obtained having the formula

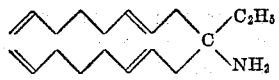

*Elemental analysis.*—Observed (percent): C, 82.67; H, 12.04; N, 5.14. Calculated (percent): C, 82.84; H, 12.08; N, 5.09.

Molecular weight.—Observed: 227. Calculated: 275.46.
Infrared absorption spectrum (cm.$^{-1}$): 820 (w.), 910 (m.), 970 (m.), 990 (w.), 1350 (w.), 1385 (w.), 1440 (w.), 1455 (w.), 1610 (w.), 1640 (w.), 2850 (m.), 2925 (s.), 2970 (s.), 3075 (w.), 3350 (w).

NMR spectrum:
P.p.m.:
```
0.90 ------------------------------------ 3H
1.15 ------------------------------------ 2H
In the vicinity of 1.44 ------------------ 6H
In the vicinity of 1.99 ------------------ 12H
In the vicinity of 4.9 ------------------- 4H
In the vicinity of 5.4 ------------------- 4H
In the vicinity of 5.7 ------------------- 2H
```
(boiling point: 150° C./2 mm. Hg).

EXAMPLE 89

A 300 cc. autoclave was charged with 0.50 g. of dichlorobis(triphenylphosphine)palladium, 1.0 g. of sodium phenoxide, 50 g. of 1-nitro propane, 100 cc. of isopropanol and 24 g. of isoprene. The mixture was stirred at 70° C. for 6 hours. The reaction mixture was distilled under a reduced pressure to obtain 25 g. of 2,7-dimethyl-9-nitro-1,6-undecadiene.

A 200 cc. autoclave was charged with 10 g. of 2,7-dimethyl-9-nitro-1,6-undecadiene obtained in the foregoing reaction, 1.5 g. of Raney nickel and 20 cc. of ethanol. After replacing air inside the autoclave by hydrogen, hydrogen was fed into the autoclave until a pressure of 100 kg./cm.$^2$ was obtained. The mixture was stirred at 40° C. for 10 hours. The mixture was distilled under a reduced pressure to obtain 7 g. of 1-ethyl-3,8-dimethylnonylamine.

EXAMPLE 90

A 200 cc. autoclave was charged with 0.018 g. (0.025 mmoles) of dichlorobis(triphenylphosphine)palladium, 1.67 g. (14.5 mmoles) of sodium phenoxide, 0.50 g. (1.9 mmoles) of triphenylphosphine and 50 g. (0.56 mmole) of 1-nitropropane. The molar ratio of phosphorus to palladium was 76 times. After replacing air inside the autoclave by nitrogen, 25 cc. (0.28 mole) of liquefied 1,3-butadiene was added to the content and the resulting content was stirred at 80° C. for 21 hours. After recovering 41 g. of the unreacted 1-nitropropane, when the content was distilled under a reduced pressure, 11 g. of 9-nitro-1,6-undecadiene

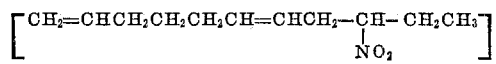

1.0 g. of 3-(nitropropyl)-1,7-octadiene

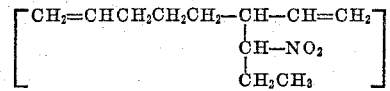

were obtained.

The determinations of structures of these nitro compounds was in accordance with the data shown in Table 1.

EXAMPLE 91

A 100 cc. autoclave was charged with 0.018 g. (0.025 mmoles) of dichlorobis(triphenylphosphine)palladium, 1.67 g. (14.5 mmoles) of sodium phenoxide, 1.0 g. (3.8 mmoles) of triphenylphosphine, 20 g. (0.22 mole) of 1-nitropropane and 50 cc. of isopropanol. The molar ratio of phosphorus to palladium was 153 times. After replacing air inside the autoclave by nitrogen, 30 cc. (0.34 mole) of liquefied 1,3-butadiene was added to the content and the resulting content was stirred at 40° C. for 40 hours. After recovering 14 g. of the unreacted 1-nitropropane, the content was distilled under a reduced pressure to obtain 32 g. of 9-nitro-1,6-undecadiene and 2 g. of 9-ethyl-9-nitro-1,6,11,16-heptadecatetraene $$\left[(CH_2=CHCH_2CH_2CH_2CH=CHCH_2)_2 \underset{NO_2}{\overset{|}{C}} CH_2CH_3\right]$$

(boiling point: 130° C./0.008 mm. Hg), respectively.

EXAMPLE 92

A 100 cc. autoclave was charged with 0.037 g. of (PPh₃)₂Pd[dibenzylideneacetone-type ligand], 0.26 g. of triphenylphosphine, 12 g. of 1-nitropropane and 60 ml. of sec-butanol. The molar ratio of phosphorus to palladium was 20 times. After replacing air inside the autoclave by nitrogen, 25 cc. of liquefied 1,3-butadiene was added to the content and the resulting content was stirred at 60° C. for 17 hours. The content was distilled under a reduced pressure to obtain 12 g. of 9-nitro-1,6-undecadiene.

EXAMPLE 93

A 300 cc. autoclave was charged with 0.035 g. of dichlorobis(triphenylphosphine)palladium, 2.0 g. of sodium phenoxide, 1 g. of triphenylphosphine, 17.8 g. (0.20 mole) of 2-nitropropane and 120 cc. of isopropanol. The molar ratio of phosphorus to palladium was 76 times. After replacing air inside the autoclave by nitrogen, 35 cc. (0.40 mole) of liquefied 1,3-btuadiene was added to the content and the resulting content was stirred at 40° C. for 60 hours. The content was distilled under a reduced pressure to obtain 35 g. of 9-methyl-9-nitro-1,6-decadiene $$\left[CH_2=CHCH_2CH_2CH_2CH=CH-CH_2-\underset{\underset{CH_3}{|}}{\overset{\overset{NO_2}{|}}{C}}-CH_3\right]$$

(boiling point: 100° C./5 mm. Hg).

EXAMPLE 94

A 300 cc. autoclave was charged with 0.035 g. of dichlorobis(triphenylphosphine)palladium, 1.2 g. of sodium phenoxide, 0.5 g. of triphenylphosphine, 15.2 g. (0.20 mole) of nitroethane and 180 cc. of isopropanol. The molar ratio of phosphorus to palladium was 38 times. After replacing air inside the autoclave by nitrogen, 70 cc. (0.80 mole) of liquefied 1,3-butadiene was added to the content and the resulting content was stirred at 40° C. for 60 hours. The content was distilled under a reduced pressure to obtain 7 g. of 9-nitro-1,6-decadiene $$\left[CH_2=CHCH_2CH_2CH_2CH=CHCH_2-\underset{NO_2}{\overset{|}{C}H}-CH_3\right]$$

(boiling point: 102° C./5 mm. Hg), 1 g. of 3-(1-nitroethyl)-1,7-octadiene $$\left[CH_2=CHCH_2CH_2CH_2-\underset{\underset{CH_3}{|}}{\overset{|}{C}H}-CH=CH_2\right]$$

(boiling point: 97° C./5 mm. Hg) and 41 g. of 9-methyl-9-nitro-1,6,11,16-heptadecatetraene $$\left[(CH_2=CHCH_2CH_2CH_2CH=CHCH_2)_2-\underset{NO_2}{\overset{|}{C}}-CH_3\right]$$

(boiling point: 125° C./0.01 mm. Hg), respectively.

EXAMPLE 95

A 300 cc. autoclave was charged with 0.053 g. of dichlorobis(triphenylphosphine)palladium, 0.8 g. (6.9 mmoles) of sodium phenoxide, 12.2 g. (0.20 mole) of nitromethane, 0.5 g. of triphenylphosphine and 150 cc. of isopropanol. The molar ratio of phosphorus to palladium was 25 times. After replacing air inside the autoclave by nitrogen, 35 cc. (0.4 mole) of liquefied 1,3-butadiene was added to the content and the resulting content was stirred at 80° C. for 20 hours. When the content was distilled under a reduced pressure, 3 g. of 9-nitro-1,6-nonadiene- $$[CH_2=CHCH_2CH_2CH_2CH=CH-CH_2-CH_2NO_2]$$

(boiling point: 99° C./5 mm. Hg), 1 g. of 3-(nitromethyl)-1,7-octadiene $$\left[CH_2=CHCH_2CH_2CH_2-\underset{CH_2NO_2}{\overset{|}{C}H}-CH=CH_2\right]$$

(boiling point: 95° C./5 mm. Hg), 14.5 g. of 9-nitro-1,6,11,16-heptadecatetraene $$[(CH_2=CHCH_2CH_2CH_2CH=CHCH_2)_2-CH-NO_2]$$

(boiling point: 120° C./0.008 mm. Hg), 3 g. of 9-nitro-1-vinyl-1,6,14-pentadecatriene $$\left[CH_2=CHCH_2CH_2CH_2CH=CH-CH_2-\underset{NO_2}{\overset{|}{C}H}-\overset{\overset{CH=CH_2}{|}}{C}H-CH_2CH_2CH_2CH=CH_2\right]$$

0.008 mm. Hg) and 5 g. of 9-nitro-9-(2,7-octadienyl-1,6,11,16-heptadecatetraene $$[(CH_2=CHCH_2CH_2CH_2CH=CH-CH_2)_3-C-NO_2]$$

(boiling point: 177° C./0.008 mm. Hg) were obtained, respectively.

EXAMPLE 96

A 100 cc. autoclave was charged with 0.018 g. of dichlorobis(triphenylphosphine)palladium, 1.7 g. of sodium phenoxide, 0.50 g. of triphenylphosphine, 8.9 g. of 2-nitropropane and 60 ml. of isopropanol. The molar ratio of phosphorus to palladium was 76 times. After replacing air inside the autoclave by nitrogen, 25 cc. of liquefied 1,3-butadiene was added to the content and the resulting content was stirred at 40° C. for 150 hours. When the content was distilled under a reduced pressure, 15 g. of 9-methyl-9-nitro-1,6-decadiene was obtained.

EXAMPLE 97

A 100 cc. autoclave was charged with 0.036 g. of dichlorobis(triphenylphosphine)palladium, 1.0 g. of sodium phenoxide, 0.3 g. of triphenylarsine, 8.9 g. of 2-nitropropane and 60 ml. of ethanol. The molar ratio of arsenic to palladium was 20:1. After replacing air inside the autoclave by nitrogen, 25 cc. of liquefied 1,3-butadiene was added to the content and the resulting content was stirred at 80° C. for 45 hours. When the content was distilled under a reduced pressure, 9 g. of 9-methyl-9-nitro-1,6-decadiene was obtained.

EXAMPLE 98

A 100 cc. autoclave was charged with 0.053 g. of dichlorobis(triphenylphosphine)palladium, 1.0 g. of sodium phenoxide, 0.71 g. of triphenylstibine, 8.9 g. of 2-nitropropane and 60 ml. of isopropanol. The molar ratio of antimony to palladium was 27:1. After replacing air inside the autoclave by nitrogen, 25 cc. of liquefied 1,3-butadiene was added to the mixture and the resulting mixture was stirred at 80° C. for 50 hours. When the content was distilled under a reduced pressure, 8 g. of 9-methyl-9-nitro-1,6-decadiene was obtained.

EXAMPLE 99

A 200 cc. autoclave was charged with 0.009 g. of dichlorobis(triphenylphosphine)palladium, 1.8 g. of sodium phenoxide, 1.2 g. of triphenylphosphine, 8.9 g. of 2-nitropropane and 80 ml. of isopropanol. The molar ratio of phosphorus to palladium was 367:1. After replacing air inside the autoclave by nitrogen, 25 cc. of liquefied, 1,3-butadiene was added to the content and the resulting content was stirred at 90° C. for 48 hours. When the content was distilled under a reduced pressure, 14 g. of 9-methyl-9-nitro-1,6-decadiene was obtained.

EXAMPLE 100

As a comparative example, a reaction was carried out without adding a phosphine reactant and the following results were obtained.

A 100 cc. autoclave was charged with 0.018 g. of dichlorobis(triphenylphosphine)paladium, 1.7 g. of sodium phenoxide, 8.9 g. of 2-nitropropane and 60 ml. of isopropanol. After replacing air inside the autoclave by nitrogen, 25 cc. of liquefied 1,3-butadiene was added to the content and the resulting content was stirred at 80° C. for 44 hours. When the content was distilled under a reduced pressure, 3 g. of 9-methyl-9-nitro-1,6-decadiene was obtained.

EXAMPLE 101

By adding a phosphine reactant to the reaction mixture of Example 100, the following results were obtained.

A 100 cc. autoclave was charged with 0.018 g. of dichlorobis(triphenylphosphine)palladium, 1.7 g. of sodium phenoxide, 8.9 g. of 2-nitropropane, 1.0 g. of triphenylphosphine and 60 ml. of isopropanol. The molar ratio of phosphorus to palladium was 153:1. After replacing air inside the autoclave with nitrogen, 25 cc. of liquefied 1,3-butadiene was added and the resulting mixture was stirred at 80° C. for 44 hours. When the content was distilled under a reduced pressure, 13.5 g. of 9-methyl-9-nitro-1,6-decadiene was obtained.

EXAMPLE 102

A 100 cc. autoclave was charged with 0.04 g. of dichlorobis(triphenylphosphite)palladium $$PdCl_2[P(OC_6H_5)_3]_2$$

0.48 g. (5 mmoles) of sodium butoxide, 0.26 g. of triphenylphosphine and 50 g. (0.39 mole) of nitrocyclohexane. The molar ratio of phosphorus to palladium was 20 times. After replacing air inside the autoclave with nitrogen, 25 cc. (0.28 mole) of liquefied, 1,3-butadiene was added to the reaction mixture and the resulting mixture was stirred at 23° C. for 60 hours. After recovering 45 g. of the unreacted nitrocyclohexane, the mixture was distilled under a reduced pressure. Four g. of 8-(1-nitrocyclohexyl)-1,6-octadiene

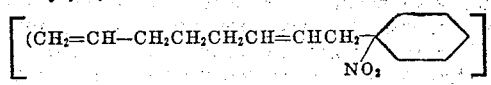

(boiling point: 140° C./5 mm. Hg) was obtained.

EXAMPLES 103–130

Example 94 was repeated using 0.05 mmole of various kinds of palladium instead of dichlorobis(triphenylphosphine)palladium. The results are shown in Table 4. (The molar ratio of phosphorus to palladium was 38:1).

TABLE 4

| | | Product (g.) | |
|---|---|---|---|
| | | $CH_2=CHCH_2CH_2CH_2CH=CHCH_2CHCH_3$<br>$\|$<br>$NO_2$ | $(CH_2=CHCH_2CH_2CH_2CH=CHCH_2)_2C-CH_3$<br>$\|$<br>$NO_2$ |
| Ex. | Palladium compound | 9-nitro-1,6-decadiene | 9-methyl-9-nitro-1,6,11,16-heptadecatetraene |
| 103 | $PdCl_2$ | 13 | 18 |
| 104 | $Pd(NO_3)_2$ | 12 | 30 |
| 105 | $Pd(CN)_2$ | 11 | 18 |
| 106 | $Pd(OCOCH_3)_2$ | 9 | 40 |
| 107 | $K_2PdCl_4$ | 8 | 39 |
| 108 | $Na_2PdCl_4$ | 10 | 35 |
| 109 | $PdCl_2[P(OCH_3)_3]_2$ | 8 | 42 |
| 110 | $PdCl_2[P(cycloC_6H_{11})_3]_2$ | 7 | 42 |
| 111 | $Pd(CNS)_2[P(C_4H_9)_3]_2$ | 11 | 31 |
| 112 | $Pd(NO_3)_2[P(C_6H_5)_3]_2$ | 10 | 39 |
| 113 | $PdCl_2[As(C_4H_9)_3]_2$ | 12 | 30 |
| 114 | $PdCl_2[As(C_6H_5)_3]_2$ | 11 | 35 |
| 115 | $PdBr_2[Sb(C_3H_7)_3]_2$ | 14 | 32 |
| 116 | $PdCl_2[Sb(C_6H_5)_3]_2$ | 12 | 25 |
| 117 | $C_6H_5COPdCl[P(C_6H_5)_3]_2$ | 14 | 29 |
| 118 | $(CH_3)_2Pd[P(C_2H_5)_3]_2$ | 12 | 35 |
| 119 | $Pd[P(C_6H_5)_3]_2 +$ <br>(benzoquinone) | 6 | 44 |
| 120 | $Pd[P(C_6H_5)_3]_2 +$ <br>$HC-COOMe$<br>$\|\|$<br>$HC-COOMe$ | 7 | 42 |
| 121 | $Pd[P(C_6H_5)_3]_2 +$ <br>(maleic anhydride) | 10 | 43 |
| 122 | $PdCl_2[P(OC_6H_5)_3]_2$ | 10 | 30 |
| 123 | $Pd(\pi\text{-}C_3H_5)ClP(C_6H_5)_3$ | 6 | 45 |
| 124 | Pd acetyl acetonate | 12 | 32 |
| 125 | $PdCl_2[\text{(benzonitrile)}C\equiv N]$ | 8 | 40 |
| 126 | $Pd(\pi\text{-}C_3H_5)_2$ | 10 | 34 |
| 127 | $Pd_2Cl_2(\pi\text{-}C_3H_5)_2$ | 9 | 38 |
| 128 | $[PdCl_2(CH_2=CH_2)]_2$ | 8 | 42 |
| 129 | $PdCl_2[CH_2=CH-CH=CH_2]$ | 7 | 44 |
| 130 | $PdCl_2$(cyclooctadiene) | 11 | 30 |

EXAMPLES 131-143

Using various kinds of palladium catalysts, various kinds of trivalent phosphorus, arsenic or antimony compounds, various kinds of bases, reducing agents and solvents, a reaction of 1-nitropropane with butadiene was carried out as in Example 74. The results are shown as Examples 131-143 in Table 5.

TABLE 5

| Example | Catalyst (g.) | Base or reducing agent (g.) | Solvent (cc.) | Nitropropane (g.) | Butadiene (cc.) | Reaction temperature (°C.) | Reaction time (hr.) | 9-nitro-1,6-undecadiene (g.) | 9-ethyl-19-nitro-1,6,11,16-heptadecatetraene (g.) | Additive (g.) |
|---|---|---|---|---|---|---|---|---|---|---|
| 131 | PdCl$_2$(PPh$_3$)$_2$ 0.02 | C$_4$H$_9$Li 1.0 | ⬡–H 6.0 | 20 | 40 | 80 | 17 | 20 | 4 | P(C$_2$H$_5$)$_3$ 0.5 |
| 132 | PdCl$_2$(PPh$_3$)$_2$ 0.03 | NaH 0.5 | C$_6$H$_6$ 60 | 12 | 20 | 70 | 20 | 8 | 1 | P(OC$_2$H$_5$)$_3$ 0.6 |
| 133 | PdCl$_2$(PPh$_3$)$_2$ 0.02 | Na$_2$CO$_3$ 1.0 | ⬡–CH$_3$ 60 | 12 | 20 | 50 | 7 | 9 | 0.6 | P(⬡–H)$_3$ 0.5 |
| 134 | PdCl$_2$(PPh$_3$)$_2$ 0.05 | C$_2$H$_5$ORb 1.0 | ⬡ 50 | 10 | 20 | 70 | 10 | 10 | 1.6 | As(CH$_3$)$_3$ 0.5 |
| 135 | PdCl$_2$(PPh$_3$)$_2$ 0.05 | p-Cl-C$_6$H$_4$ONa 1.0 | ⬡–OH 70 | 20 | 80 | 40 | 40 | 5 | 55 | P(⬡–OCH$_3$)$_3$ 0.7 |
| 136 | PdCl$_2$(PPh$_3$)$_2$ 0.03 | CH$_3$CH=N$^{ONa}_{O}$ 1.2 | CH$_3$CH$_2$CH–CH$_3$ $\phantom{.}$ OH | 20 | 40 | 40 | 30 | 30 | 2 | P(⬡–Cl)$_3$ 0.6 |
| 137 | PdCl$_2$(PPh$_3$)$_2$ 0.03 | CH$_2$=CHCH$_2$ONa 1.0 | (CH$_3$)$_3$COH 6.0 | 10 | 18 | 100 | 2 | 10 | 1 | Sb(C$_6$H$_5$)$_3$ 0.7 |

TABLE 5—Continued

| Example | Catalyst (g.) | Base or reducing agent (g.) | Solvent (cc.) | Nitropropane (g.) | Butadiene (cc.) | Reaction temperature (°C.) | Reaction time (hr.) | 9-nitro-1,6-undecadiene (g.) | 9-ethyl-9-nitro-1,6,11,16-heptadecatetraene (g.) | Additive (g.) |
|---|---|---|---|---|---|---|---|---|---|---|
| 138 | PdCl₂(PhPCH₂CH₂PPh₂) 0.04 | NaBH₄ | ⬡ | 12 | 18 | 70 | 6 | 10 | 2 | As(C₆H₅)₃ 0.6 |
| 139 | PdCl₂(PPh₃)₂ 0.03 | n-BuLi 0.7 | 60 | 15 | 20 | 50 | 15 | 13 | 2 | P(—⬡—CH₃)₃ 0.5 |
| 140 | PdCl₂(PPh₃)₂ 0.04 | Et₃Al(OMe) 0.6 | ⬡H | 16 | 18 | 80 | 17 | 9 | 2 | P(n-C₄H₉)₃ 0.5 |
| 141 | PdCl₂[bipyridyl] 0.03 | NH₂—NH₂·H₂O 0.7 | ⬡ | 15 | 18 | 70 | 12 | 9 | 1 | As(—⬡—CH₃)₃ 0.7 |
| 142 | [π-allylPdCl]₂ 0.018 | NaOPh 1.2 | (CH₃)₂CH-OH 60 | 18 | 70 | 40 | 40 | 1 | 68 | PPh₃ 0.7 |
| 143 | [π-allylPdCl]₂ 0.018 | KOPh 1.2 | CH₃CH₂CH₂CH₂OH 100 | 18 | 35 | 30 | 25 | 25 | 4 | PPh₃ 0.5 |

What is claimed is:
1. The unsaturated nitro compound of the formula

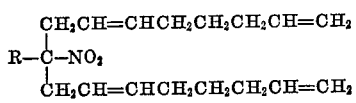

wherein R is a member selected from the group consisting of hydrogen, alkyl having 1-5 carbon atoms, cycloalkyl having 5-12 carbon atoms and aryl having 5-12 carbon atoms.

2. The unsaturated nitro compound of the formula

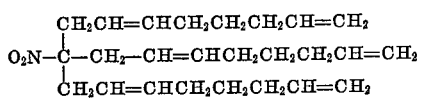

References Cited

UNITED STATES PATENTS

| | | | |
|---|---|---|---|
| 3,299,111 | 1/1967 | Adams et al. | 260—583 H |
| 3,485,875 | 12/1969 | Menapace | 260—644 X |
| 3,530,187 | 9/1970 | Shryne | 260—583 H |

FOREIGN PATENTS

| | | | |
|---|---|---|---|
| 182,710 | 11/1966 | U.S.S.R. | 260—644 |

OTHER REFERENCES

Perekalin: Unsaturated Nitro Compounds, Daniel Davey & Co., Inc., New York, N.Y., pp. 291 to 294 (1964).

LELAND A. SEBASTIAN, Primary Examiner

U.S. Cl. X.R.

260—563 R, 580, 583 H, 645

UNITED STATES PATENT OFFICE
CERTIFICATE OF CORRECTION

Patent No. 3,754,041                    Dated August 21, 1973

Inventor(s) Tetsuo Mitsuyasu et al

It is certified that error appears in the above-identified patent and that said Letters Patent are hereby corrected as shown below:

Column 4, line 67, after "$PdSO_4$" delete the apostrophe (').

Column 7, line 20, after "$p-C_6H_5-C_6H_4-ONa$" insert ---$HO-C_6H_4ONa$---.

Column 7, line 38, after "EtMgBr" delete ---, MgBr---.

Column 10, lines 31 and 32, "120° C./0.008 mm. Hg), 3 g of 9-nitro-10-yl)" should be ---99°C./5 mm. Hg), 0.9 g of 3-nitro-methyl)---.

Column 11, Table 1, the NMR spectrum, right-hand column, third line, "2H" should be ---6H---.

Column 20, line 42, in the formula, "$CHCH_2-CH-NO_2$" should be ---$CH-CH_2-CH_2NO_2$---.

Column 25, line 37, "btuadiene" should be ---butadiene---.

Column 28, Table 4, line under "product (g.)", the single bond, first occurrence, should be placed as follows:

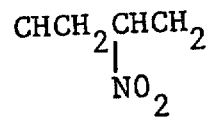

Column 29, Table 5, second heading from the right, line 2 of heading, delete "j" before ---9---.

Column 29, Table 5, second heading from the right, line 6, complete the spelling of "heptadecatetraene".

UNITED STATES PATENT OFFICE
CERTIFICATE OF CORRECTION

Patent No. 3,754,041                  Dated August 21, 1973

Inventor(s) Tetsuo Mitsuyasu et al

Page 2

It is certified that error appears in the above-identified patent and that said Letters Patent are hereby corrected as shown below:

Column 29, Table 5, right-hand heading, delete (g.) after "Additive".

Column 31, Table 5, second heading from the right, line 6, complete the spelling of "heptadecatetraene".

Column 31, Table 5, right-hand heading, delete (g.) after "Additive".

Signed and sealed this 19th day of February 1974.

(SEAL)
Attest:

EDWARD M. FLETCHER, JR.
Attesting Officer

C. MARSHALL DANN
Commissioner of Patents